United States Patent [19]

Nootenboom et al.

[11] Patent Number: 4,753,356
[45] Date of Patent: Jun. 28, 1988

[54] TRANSFER CART WITH IMPROVED BASE AND GATE GUIDES

[75] Inventors: Harold L. Nootenboom, Coon Rapids; Gerald D. Pedersen, Cannon Falls; Ronald L. Rosa, Eagan, all of Minn.

[73] Assignee: Cannon Equipment Company, Cannon Falls, Minn.

[21] Appl. No.: 784,927

[22] Filed: Oct. 4, 1985

[51] Int. Cl.⁴ .............................................. A47F 5/00
[52] U.S. Cl. .................................. 211/134; 211/183; 280/79.3
[58] Field of Search ...................... 211/134, 182, 183; 280/79.3, 79.1 R; 403/363

[56] References Cited

U.S. PATENT DOCUMENTS

| | | | |
|---|---|---|---|
| 1,943,023 | 1/1934 | Langenkamp et al. | 280/79.3 |
| 2,076,811 | 4/1937 | Ehlers | 403/363 |
| 2,492,002 | 12/1949 | Paddock | 280/79.3 |
| 2,870,980 | 1/1959 | Higgins et al. | 211/186 X |
| 3,797,842 | 3/1974 | Swick, Jr. et al. | 211/186 X |
| 3,835,793 | 9/1974 | Goddard | 211/134 X |
| 3,971,476 | 7/1976 | Konstant | 211/134 |
| 4,458,906 | 7/1984 | Lamson | 280/79.1 R X |
| 4,518,279 | 5/1985 | Suttles | 211/191 X |

FOREIGN PATENT DOCUMENTS 1461325  12/1966  France ............................. 280/79.3

*Primary Examiner*—Robert W. Gibson, Jr.
*Assistant Examiner*—Blair M. Johnson
*Attorney, Agent, or Firm*—William C. Flynn; Henry C. Kovar

[57] ABSTRACT

A new and improved transfer cart, specifically for the transfer, delivery and retail display of bottled milk or other packaged goods, has a new base and a new bottle retainer guide. The base is formed of a single elongate strip rolled in to a recurved outwardly convex section and folded and welded into a continuous band with inward facing top and bottom flanges and an outward extending bumper; corner posts are welded into the base band, and base beams are formed into the same cross-section of the base band and have swagged ends fitted into and affixed into the base band. The gate guides hold a liftable gate on the rear of the cart, the guides extend contiguously from the second to the top shelf gusset reinforcing the cart, and shelf tabs extend from each guide over the back of each shelf, and each shelf is welded to a pair of respective tabs to strengthen the cart and enable usage of less steel. A new method of making a cart, and a cart base has the steps of blanking and piercing a flat strip for a base, rolling the base into a recurved convex section, bending the formed section into a closed band, and fabricating the cart using the closed band to save material and time while making a stronger, lighter-weight sanitary cart.

4 Claims, 4 Drawing Sheets

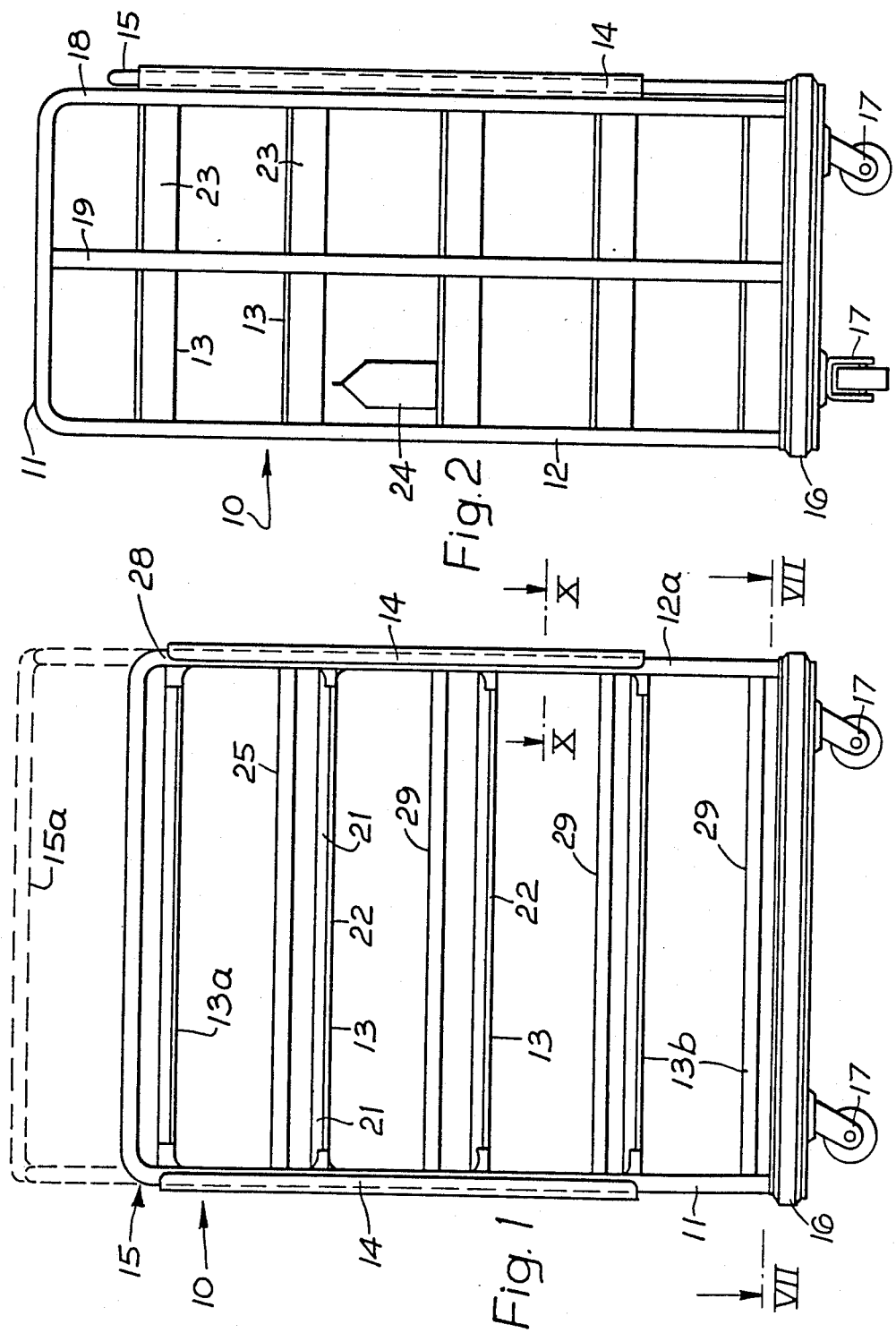

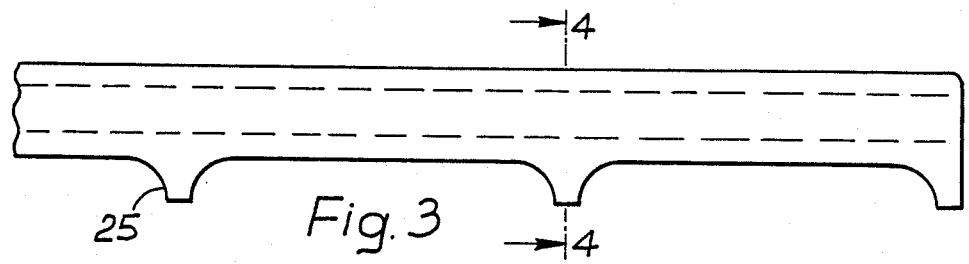
Fig. 3
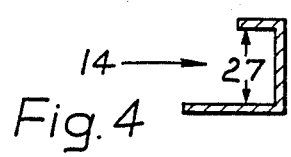
Fig. 4
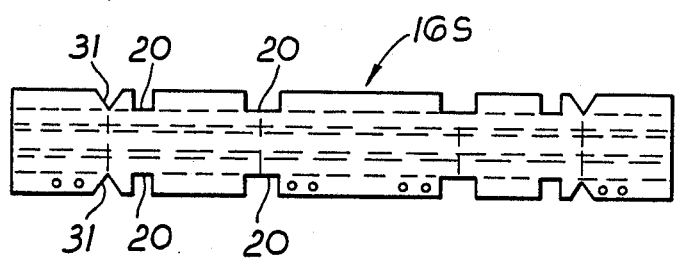
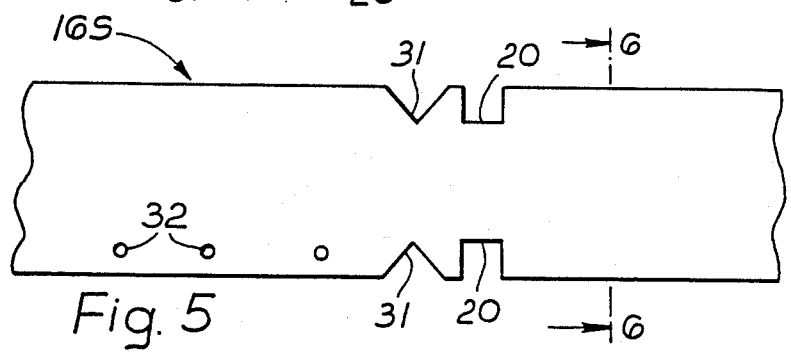
Fig. 5
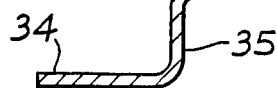
Fig. 6

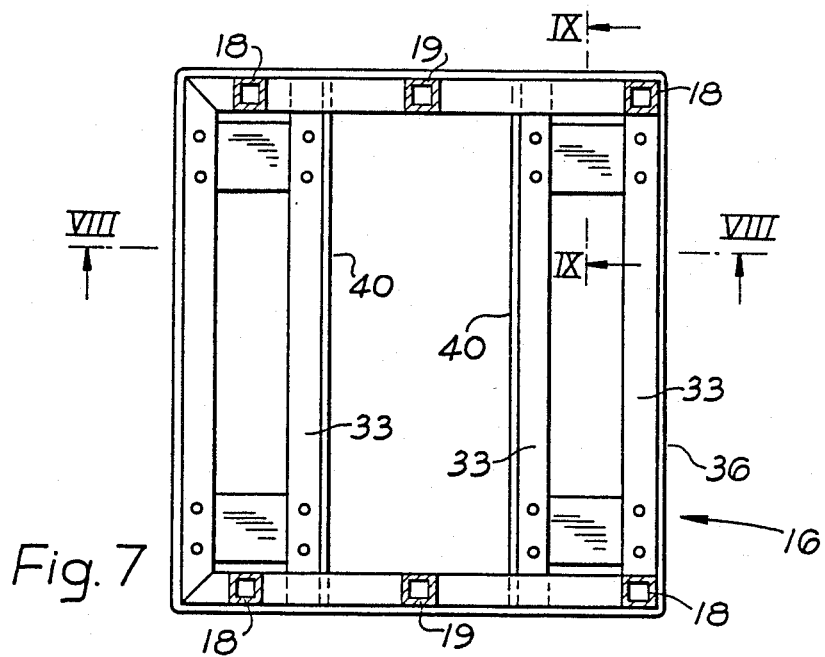
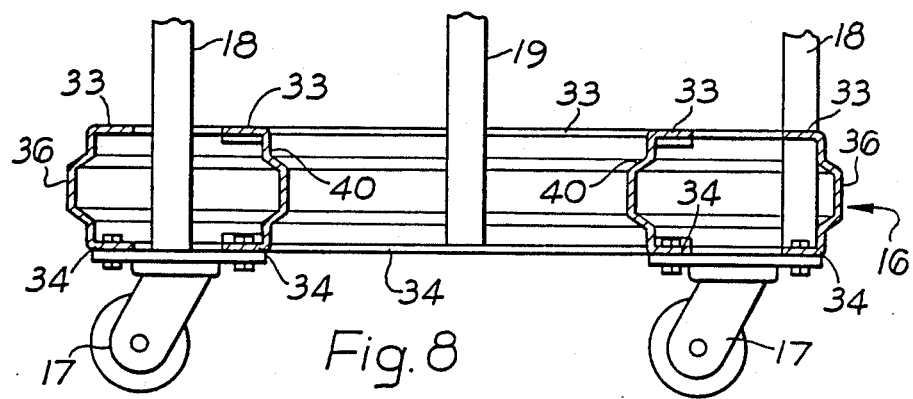
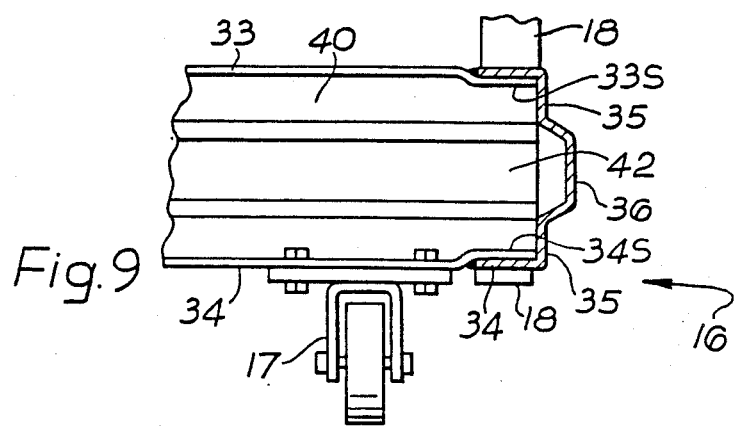

TRANSFER CART WITH IMPROVED BASE AND GATE GUIDES

BACKGROUND OF THE INVENTION

1. Field of the Invention

The present invention pertains to a light-weight, sturdy transfer cart for transporting food products and the like, and to a method for making a transfer cart.

2. Description of the Prior Art

In order to expedite the handling of various food products from the production plant to the retail outlet, the trend has been to provide transfer carts onto which food products are directly loaded. The loaded transfer carts may then be wheeled into a vehicle for transport to the retail outlet. At the retail outlet, the transfer carts are removed from the vehicle and wheeled into place in a storage or display area of the store. While on display, the customer may inspect and select the product directly from the transfer cart. When emptied, the transfer carts are removed from display, and subsequently returned to be cleaned and sanitized if necessary and refilled with product containers.

One industry especially suited for using transfer carts of this type is the milk industry. The concept of employing transfer carts is particularly suited for use in handling milk containers which are extremely heavy and bulky while being relatively fragile. Additionally, milk products are spoilable food products which when spilled and allowed to stand create an unsightly mess often having an unpleasant odor and additionally provide a breeding ground for bacteria and the like which may create a health hazard.

Another modern trend in the industry is to provide transfer carts that can be mechanically loaded with the product containers. The transfer cart is typically loaded by holding it adjacent a loader which arranges the product containers to fit on the transfer cart and places the product containers onto each shelf of the transfer cart.

Previously, some transfer carts have been constructed having shelves with upwardly extending retaining lips at their front and rear edges. These retaining lips, while very effective in retaining the product containers on the shelves during transport, have greatly complicated the automated loading process in that the product containers must be loaded over the lip and then onto the shelf. As a result, a "shovel" carrying the product containers must be inserted into the cart over the shelf lip after which a bar holds the product containers in place while the "shovel" is withdrawn dropping the product containers to the shelf. Because milk product containers are heavy, the entire shelf cannot be loaded with a single "shovel". Multiple "shovels" of product containers must be inserted thereby slowing and further complicating the loading process. Furthermore, as the product containers are dropped from the "shovel" some breakage occurs, increasing the cost of the product to the consumer and producing spillage which is both unsightly and unhealthy.

The use of a vertically movable gate in the cart allows the loader to raise the gate and then easily slide the product containers onto the shelves. Thus, an entire shelf may be loaded by pre-arranging the product containers and sliding all of the product containers onto the shelf at once, thereby simplifying the loading procedure while decreasing breakage during loading.

U.S. Pat. No. 3,797,842 issued Mar. 19, 1974 to Swick, Danielson, and Taylor discloses a wheeled cart with openable gate. This particular construction provides a gate which, in use, has been too often deformed and has been and jammed and is difficult to fabricate due to the larger number of parts.

The known prior art has not been able to effectively overcome the construction, loading, and sanitation problems.

OBJECTS OF THE INVENTION

It is an object of the present invention to provide an improved method of making a transfer cart for transferring and displaying food products and the like which overcomes the fabrication, loading, and sanitation problems of the known transfer carts.

It is an object of the present invention to make a stronger and lighter cart that requires less steel and uses very efficient manufacturing techniques.

It is an object of the present invention to provide an improved, mechanically loadable transfer cart with a fixed unitary base.

It is an object of the present invention to provide an improved transfer cart base with an outwardly extending unitary structural bumper.

It is an object of the present invention to provide an improved transfer cart with an improved non-jamming loading gate and gate guide.

It is an object of the present invention to provide an improved method for making a unitary convex recurved transfer cart base.

It is a further object of the present invention to provide an improved method for making a transfer cart with a unitary convex recurved transfer cart base.

These and other objects of the invention will become manifest to those versed in the art upon review and usage of the teachings herein.

SUMMARY OF THE INVENTION

According to the principles of the present invention, a transfer cart for containers has upright posts, a plurality of vertically spaced shelves, a movable gate with a retainer rung for each shelf, and a unitary base at the bottom of the corner posts, the base being a continuous band with a convex recurved cross-section providing an integral bumper for protection of the cart.

A structural base for a transfer cart has a continuous unitary closed band formed from a single strip of metal and having a formed convex recurved cross-section providing a cart bumper.

A transfer cart has a main frame with upright posts, a plurality of spaced apart shelves, a vertically movable gate having a rung for retaining containers on each shelf with the gate being movable to an alternate loading position to open the shelves, and an improved gate guide structure having a pair of combination elongate gate guide and corner post stiffeners which are secured to rear corner posts and which concavely face each other.

A method of making a base for a cart has the steps of blanking and piercing a planar base strip, forming the strip along its length into a convex recurved cross-section, closing the formed strip into an enclosure, and joining the ends of the formed strip to form a continuous base band.

A method of making a cart has the steps of forming upright frames, forming a planar strip along its length into a convex recurved cross-section, folding the formed strip into a rectangle, joining the strip ends to form a continuous base band, and affixing upright posts of the side frame into the base band.

These and other aspects and manifestations of the invention will become manifest to those versed in the art upon reference to and renewal of the disclosures and teachings herein.

BRIEF DESCRIPTION OF THE DRAWINGS

FIG. 1 is an elevational rear view of the preferred embodiment of the transfer cart of the present invention showing the gate in its normal position and with the gate moved to its extended or "loading" position shown in dotted lines;

FIG. 2 is an elevational side view of the preferred embodiment of the transfer cart;

FIG. 3 is a plan view of the unformed blank of the gate guide with dotted lines indicating bend lines;

FIG. 4 is a cross sectional view of the formed gate guide taken approximately at IV—IV of FIG. 3;

FIG. 5 is a plane view of the unformed blank of the unitary base of the transfer cart;

FIG. 6 is a cross sectional view of the formed unitary base taken approximately at VI—VI of FIG. 5;

FIG. 7 is a top plan view of the base of the structure of FIG. 1, taken through lines VII—VII of FIG. 1;

FIG. 8 is an elevational sectional view taken through lines VIII—VIII of FIG. 7;

FIG. 9 is an elevational sectional view taken through lines IX—IX of FIG. 7;

DESCRIPTION OF THE PREFERRED EMBODIMENT

Figure 10:
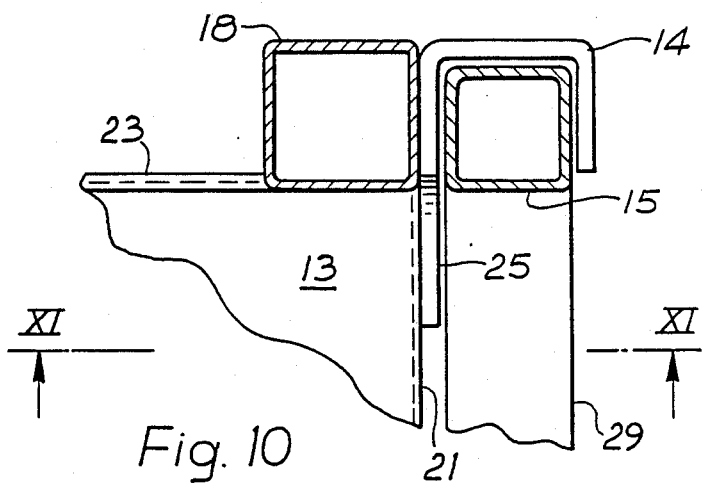
FIG. 10 is a downward looking sectional view taken through lines X—X of FIG. 1.
Figure 11:
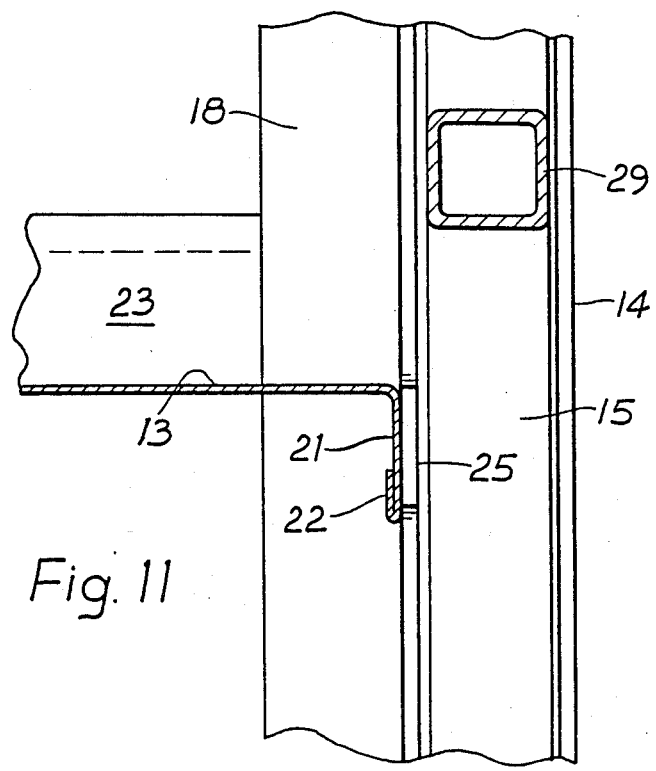
FIG. 11 is an elevational sectional view taken through lines XI—XI of FIG. 10.

Referring to FIGS. 1 and 2, the transfer cart generally indicated by the numeral 10 has a main frame 11 having the two side frame structures 12 with plurality of shelves 13 vertically spaced and extending between the side frame structures. A gate guide 14 is affixed at the rear portion of each side frame structure 12. The gate 15 is fitted slidingly between the gate guides 14. The unitary base 16 attaches at the bottom ends about the periphery of the side frame structures. Caster wheels 17 enabling moving the transfer cart 10 are attached to the bottom of the unitary base 16.

Each side frame structure 12 has corner posts 18 with a vertical reinforcement post 19 centrally attached to the upper horizontal portion of the side frame 12. The corner posts 18 and thevertical reinforcement 19 are constructed, preferably, from stainless steel tubing. The downwardly extending ends of the corner posts 18 and the vertical reinforcement 19 extend through frame cut-outs 20 in the unitary base 16 and are affixed thereto, preferably welded, both on the top and bottom of the base 16.

Each shelf 13 is constructed from a sheet of material, preferably stainless steel, having a down-turned lip 21 with a hemmed edge 22 at the rear edge. The three remaining edges of each shelf 13 have an upturned lip 23 with a hemmed edge 22. The shelves 13 are attached to and extend from the first side frame structures 12 to the second side frame structure 12a. The shelves 13 are vertically spaced so as to contain and allow the unrestricted access to the product containers 24 thereon.

The unformed gate guides 14, as shown in FIG. 3, are cut from a sheet of material, preferably stainless steel, having integral shelf gusset and attachment tabs 25 extending outwardly therefrom for attachment to the side frame structure 12 and the respective shelves 13. In fabrication, the gate guides 14 are formed approximately to a right angle along the dotted lines 26 to form the concave elongate channel 27 cross section as illustrated in FIG. 4. The channel 27 size is slightly greater than the outer dimensions of the gate 15 allowing the gate 15 to slidingly fit therein.

Each gate guide 14 is attached to the rear corner post 18 of a respective side frame structure 12 and is preferrably welded thereto and extends contiguously from the second shelf 13b of the transfer cart 10 upwards along the side frame structure to the top shelf 13e. Each of the gate guide attachment tabs 25 aligns with one shelf 13 and is affixed thereto, thereby gusseting and reinforcing each shelf 13 at the juncture with the side frame structure 12. Each gate guide 14 also serves to significantly strengthen a respective upright post 18 to strengthen the upper part of the cart frame 11.

The gate 15 has an elongated U-shaped outer frame having a horizontal handle 28 and vertical legs 29 extending downwardly from each end of the horizontal handle 28. A plurality of parallel horizontal rungs 30 are disposed extending between and attached to the vertical legs 29. The gate 15 is constructed from a malleable metal, preferably stainless steel tubing, having exterior dimensions so that the gate legs 29 slidingly fit into channels 27 of the gate guides 14. The gate handle 28 and the plurality of rungs 30 have lengths disposing the gate legs 29 within the channels 27 of the gate guides 14. The gate guides 14 thus retain the gate legs 29 along a substantial vertical length preventing the gate 15 from rotating in the gate guides 14 and jamming therein.

The gate rungs 30 are uniformly vertically spaced, corresponding to the vertical spacing of the shelves 13 and vertically disposed so that when the gate 15 is in a normal position, as illustrated in FIG. 1, each gate run 30 is positioned slightly, preferably two or three inches, above each shelf 13. When, as illustrated by the dotted lines in FIG. 1, the gate 15a is vertically extended, the gate rungs 30 are disposed adjacent and at the same level as each shelf 13 allowing unrestricted access to the rear of each shelf 13 for loading or removal of product containers 24.

The unitary cart base 16 is made from a flat strip 16s of malleable metal, preferably stainless steel, as shown in FIG. 5. The cart base 16 is fabricated by first cutting the strip 16s to the proper dimensions. The post cut-outs 20c corner notches 31, and mounting holes 32 are next formed at the proper locations in the base strip 16s. The base strip 16s is then formed, preferably by passage through a roll mill, into a U-shaped channel having an upper lip 33, a lower lip 34, a pair of first vertical portions 35, and an outwardly and spaced bumper 36, and recurved sections 37 between the vertical portions 35 and the bumper 36. The forming operation subsequently bends the formed base strip 16s into a closed rectangle by forming corners at the corner notches 31 and corner post cut-outs 20C. Thus the first end 38 of the formed base 16s is placed adjacent the second end 39 of the formed base 16s and the two ends attached, preferably welded together, so that the base strip 16s forms a continuous enclosed unitary structure which is a continuous base band 16.

FIGS. 7, 8 and 9 clearly show the novel base beams 40 in the base 16. Each beam 40 is formed of a flat length of the same malleable material as is the base 16. Be it noted that the base 16 and beams 40 both have the same formed cross section that is shown in FIG. 6 and they are both made on the same roll mill. Each beam 40 has both of its ends 42 swagged together wherein the upper and lower lips 33s, 34s are swagged together to fit inside of the base lips 33, 34 as best shown in FIG. 9. The swagged ends 42 are then welded top and bottom to the base 16. Each beam 40 is welded into the base 16 adjacent to and parallel to and spaced from a respective side of the base band 16 as shown best in FIGS. 7 and 8. Preferrably the beams 40 are along the front and rear sides of the base band 16. The base bands 40 have their convex sections facing each other, and have their lips 33, 34 facing the lips of the adjacent sides of the base band 16.

The unitary base band 16 may then, be attached to the side frame structures 12 by passing the upright corner posts 18 and the center vertical reinforcement post 19 of the side frame structure 12 through the appropriate base cut-outs 20 and placing the ends of the corner posts 18 and the vertical reinforcement post 19 abutting against the first vertical portions 35 of the base 16. Once so placed, the side frame structures 12 are attached to the base 16 using a suitable fastening means, preferrably welding.

The casters 17 are attached to the co-planar bottom lips 34 of the unitary base 16 and the base beams 40 through the mounting holes 32 using a suitable fastener such as bolts. The casters 17 structurally tie the base beams 40 to the base band 16.

With the side frame structures 12 attached to the base 16, the gate guides 14 are attached to the rear portion of the side frame structures 12. The shelves 13 may then be attached between the side frame structures 12 and affixed to the gate guide attachment tabs 25. The gate 15 is lastly added by placing the gate 15 slidingly into the gate guides 14.

The outwardly extending base bumper 36 also protects the main frame 11 and the gate guides 14 and the gate 15 from damage from impact with adjacent transfer carts 10 when the carts 10 are jostled about, such as in a warehouse or in a moving vehicle during transit.

In its operation, the cart 10 is first washed and sanitized using a suitable method, such as the application of hot, high pressure aqueous cleaning and disinfecting solution. The cart 10 may then be loaded either manually or mechanically.

When the transfer cart 10 is to be loaded manually, the transfer cart 10 is rolled on the caster wheels 17 to a convenient loading position, the gate 16 is lifted fully upwards allowing the operator unrestricted access to the product shelves 13 so that the product containers 24 can be readily placed onto the shelves 13.

When the transfer cart 10 is loaded mechanically, the transfer cart 10 is positioned abutting and typically removably retained by the loading machine. The gate 16 is fully extended upwardly allowing a cart loader to readily access the shelves 13. Sufficient product containers 24 to fill one shelf 13 are typically arranged on a loading platform. The product containers 24 are then pushed onto their respective shelf 13. After filling all of the shelves 13, the gate 16 is downward retracted so that the gate rungs 30 retain the product containers 24 on the shelves 13 and the transfer cart 10 is from the loading machine removed.

As thus loaded, the transfer cart 10 is wheeled onto a vehicle used for transporting the transfer cart 10 containing the product containers 24 to a retail outlet. At the retail outlet, the transfer cart 10 may be wheeled into a storage area or placed in a display area.

Once placed in a didplay area, the product containers 24 are displayed and available for customer selection. The customer selects the product by removing the product container 24 from the transfer cart 10 by lifting the product container 24 over the front upturned lip 23 of the shelf 13. When a number of product containers 24 have been removed, customer selection may be facilitated by sliding the remaining product containers 24 forward to the front upturned lip 23 of the respective shelves 13.

When the product containers 24 have been completely removed, the transfer cart 10 is moved to a storage area and a a second and back up full transfer cart 10 is wheeled in as a replacement. The emptied transfer carts 10 are subsequently returned for reloading.

In the preferred embodiment shown, the shelves 13 are placed horizontally between the side frame structures. In another embodiment, the shelves 13 slope downwardly toward the front upturned lip 23 facilitating the movement of product containers 24 to the front of each shelf 13. This construction facilitates customer selection of the product containers 24 as the product containers 24 are automatically moved forward by gravity as the front product containers 24 are removed.

In another embodiment, the gate guide attachment tabs 25 are not used and the shelves 13 are pivotally mounted at the end adjacent the gate 15. Thus, the product containers may be preferentially removed from the top shelf 13e which is first emptied. The emptied top shelf 13e is then tipped upward and retained by a latching means. With the top shelf 13e latched in an upward position, the customers have free access to the second from the top shelf 13d thus facilitating ease in selection of the product containers 24 and so on down to the base level shelf 13a.

This new and improved cart 10, having the new and improved base 16, and the new and improved gate guides 14 with the shelf gusset tabs 25, can be fabricated with less metal and with more economical manufacturing techniques than the prior art costs. This new cart also weighs substantially less and is easier and less costly to transport, and is stronger and more resistant to deformation than previous carts.

The cart 10 is also devoid of traps to catch spilled milk and the like, and to catch sanitizing solutions and rinse water. The cart 10 has an excellent improved appearance and is extremely suitable for the transport, storage and display of milk bottles to the consuming public.

These advantages, usages and many other usages will be found and realized by those versed in the art, and although various minor modifications may be suggested and employed by those versed in the art, be it known that we wish to embody within the scope of the patent granted hereon all such embodiments as reasonably come within the scope of our contribution to the art.

We claim as our invention:

1. In a transfer cart for use in transporting and displaying products such as food containers, having
   a cart base having wheels and defining a periphery of the cart;
   a vertically extending frame having two rear corner posts and two front corner posts, said posts being mounted to and extending upward from said base;

a plurality of vertically spaced apart product support shelves extending between and supported by said corner posts; and a sliding gate disposed along a rear side of the cart and between the rear corner posts, said gate having a pair of vertical legs and a plurality of transverse rungs in between and fastened to the legs and normally positioned between and blocking access to the product shelves, said gate being vertically movable to an alternative loading position wherein the rungs are at the same level as the shelves enabling products to be loaded on the shelves from the rear of the cart;

the improvement comprising, a vertically elongated single-piece gate guide affixed on each rear corner post, each guide having an open generally C-shaped cross section which concavely faces the opposite said gate guide and slidingly retains one of the gate legs enabling the gate to be slid upwards in the guides from the normal position to the loading position, each of said guides being structurally integral and extending a majority of the height of a respective corner post, each said guide being structurally fastened to a respective corner post in a weldment that extends a majority of the height of the respective post and mutually structurally reinforces both the majority of the height of the respective corner post and the entire length of the guide, for maintaining the entire length of each guide straight and for maintaining the guides parallel to each other under severe service and means spaced from a respective said rear post and fastening each guide directly to each said shelf adjacent a respective shelf corner, for further support of said shelves by said guides.

2. The transfer cart according to claim 1, wherein the shelf fastening means are a plurality of integral shelf attachment gusset tabs on each guide and extending inwardly along the rear portion of the frame from said C-shaped cross section each tab overlying and being structurally attached to a respective one of said shelves.

3. The transfer cart according to claim 2, in which said guides both extend contiguously from the top said shelf down to the second said shelf from the bottom, and in which each guide has said shelf fastening means secured to each respective shelf from the top shelf down to said second shelf.

4. The transfer cart of claim 1, in which the cart base has an outwardly generally convex metal band with an integral outward facing metal bumper spaced outward of and extending completely around an outer side of each corner post, said bumper also being spaced outward sideways and rearward beyond both of the guides and the gate for protection of the straightness and parallelism of the guides.

* * * * *